United States Patent
Wen et al.

(10) Patent No.: US 10,095,908 B2
(45) Date of Patent: Oct. 9, 2018

(54) PIXEL SENSING CIRCUIT FOR FINGERPRINT IDENTIFICATION, FINGERPRINT IDENTIFICATION SYSTEM AND ELECTRONIC DEVICE THEREOF

(71) Applicant: Shenzhen Goodix Technology Co., Ltd., Shenzhen (CN)

(72) Inventors: Ya-Nan Wen, Shenzhen (CN); Chung-Yi Wang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 64 days.

(21) Appl. No.: 15/371,243

(22) Filed: Dec. 7, 2016

(65) Prior Publication Data

US 2017/0083735 A1 Mar. 23, 2017

Related U.S. Application Data

(63) Continuation of application No. PCT/CN2015/077401, filed on Apr. 24, 2015.

(51) Int. Cl.
G06K 9/28 (2006.01)
G06K 9/00 (2006.01)

(52) U.S. Cl.
CPC ............ *G06K 9/0002* (2013.01); *G06K 9/00* (2013.01); *G06K 9/00087* (2013.01)

(58) Field of Classification Search
CPC .................................................. G06K 9/0002
See application file for complete search history.

(56) References Cited

U.S. PATENT DOCUMENTS

| 7,864,992 B2 * | 1/2011 | Riedijk | G06K 9/0002 382/124 |
| 2016/0063301 A1 * | 3/2016 | Wu | G06K 9/00033 382/124 |

FOREIGN PATENT DOCUMENTS

| CN | 103679163 A | 3/2014 |
| JP | 2014142753 A | 8/2014 |
| KR | 1020140010797 A | 1/2014 |

* cited by examiner

*Primary Examiner* — Brian Werner

(57) ABSTRACT

Disclosed is a pixel sensing circuit, which is in a fingerprint identification mode or a noise detection mode, and includes: a plurality of shielding layers, including a first-type shielding layer and a second-type shielding layer, the second shielding layer being coupled to a ground terminal; and a charging circuit, coupled to the capacitance sensing layer and the first-type shielding layer, and comprising a positive voltage generator configured to providing a positive voltage; wherein when the pixel sensing circuit is in a fingerprint identification mode, the charging circuit periodically provides the positive voltage for the capacitance sensing layer and the first-type shielding layer; or when the pixel sensing circuit is in the noise detection mode, the charging circuit cuts off connections between the positive voltage generator and the capacitance sensing layer and the first-type shielding layer, and periodically outputs a voltage of the capacitance sensing layer to a first output terminal.

10 Claims, 4 Drawing Sheets

US 10,095,908 B2

PIXEL SENSING CIRCUIT FOR FINGERPRINT IDENTIFICATION, FINGERPRINT IDENTIFICATION SYSTEM AND ELECTRONIC DEVICE THEREOF

CROSS-REFERENCE TO RELATED APPLICATIONS

The present application is a continuation of international application No. PCT/CN2015/073908, filed on Mar. 9, 2015, which claims priority to Chinese Patent Application No. 201410534375.6, filed on Oct. 11, 2014, both of which are hereby incorporated by reference in its entireties.

TECHNICAL FIELD

The present disclosure relates to the technical field of fingerprint identification, and in particular, relates to a pixel sensing circuit for fingerprint identification, a fingerprint identification system and an electronic device thereof.

BACKGROUND

With the dramatic development of science and technology, mobile phones, digital cameras, tablet computers, laptop computers and the like portable electronic devices are becoming indispensable in people daily lives. Since these portable electronic devices are generally personally used and store some private data, the data and information stored therein, for example, address books, photos, personal information and the like are private. Once the electronic device is lost, such information and data would be taken used by others in an unauthorized manner, and some loss may be consequentially caused. At present, the electronic device is generally protected from being used in an unauthorized manner by setting password. However, the password is apt to be leaked or cracked, and thus the security is not ideal. Further, a user needs to remember the password and needs to enter the password correctly before using the electronic device, and if the user forgets the password, great inconvenience would be caused to the user. Therefore, fingerprint identification has been developed to achieve the objective of identity authentication, to improve the security of the personal data and information.

Capacitive fingerprint identification is a well-populated fingerprint identification mode, which judges the ridges and valleys of a user by sensing variations of the capacitance. However, the accuracy of the capacitive fingerprint identification is subject to a parasitic capacitor in a pixel sensing circuit. For example, to prevent a capacitance sensing layer from the interference from other circuits, in the related art, during circuit deployment, a metal layer is arranged under the capacitance sensing layer to achieve a shielding effect and thus prevent the circuits under the metal layer from causing interference to the capacitance sensing layer. However, a parasitic capacitor may be formed between the capacitance sensing layer and the metal layer, and the capacitance of the parasitic capacitor is generally greater than the capacitance of a contact capacitor generated by contact of the finger, which affects judgment of the capacitance of the contact capacitor by the pixel sensing circuit, and thus lowers the accuracy of fingerprint identification.

Further, noise detection has been widely applied to various identification systems to improve the identification accuracy. In the related art, with respect to the pixel sensing circuit for fingerprint identification, if noise at different frequencies need to be detected, clock pulse signals (which may also be referred to as clock signals) of the pixel sensing circuit needs to be modified. When different pixel sensing circuits detect the noise at different frequencies, the different pixel sensing circuits need to access different clock pulse signals, causing difficulty is practice of the circuit.

SUMMARY

A first technical problem to be solved by the present disclosure is to provide a pixel sensing circuit for fingerprint identification. The noise detection function is integrated into the pixel sensing circuit for fingerprint identification, such that the pixel sensing circuit may be operable in a fingerprint identification mode or a noise detection mode, thereby improving the accuracy of fingerprint identification.

The present disclosure is implemented by using the following technical solution: a pixel sensing circuit for fingerprint identification, which is in a fingerprint identification mode or a noise detection mode and includes:

a capacitance sensing layer;

a plurality of shielding layers, including a first-type shielding layer and a second-type shielding layer, the second shielding layer being coupled to a ground terminal; and a charging circuit, coupled to the capacitance sensing layer and the first-type shielding layer, and including a positive voltage generator configured to providing a positive voltage;

wherein when the pixel sensing circuit is in a fingerprint identification mode, the charging circuit periodically provides the positive voltage for the capacitance sensing layer and the first-type shielding layer; and when the pixel sensing circuit is in the noise detection mode, the charging circuit cuts off connections between the positive voltage generator and the capacitance sensing layer and the first-type shielding layer, and periodically outputs a voltage of the capacitance sensing layer to a first output terminal.

A second technical problem to be solved by the present disclosure is to provide a fingerprint identification system including a plurality of pixel sensing circuits as described above, wherein the plurality of pixel sensing circuits are arranged to an array.

A third technical problem to be solved by the present disclosure is to provide an electronic device including the fingerprint identification system as described above.

According to the present disclosure, the noise detection function is integrated into the pixel sensing circuit for fingerprint identification, such that the pixel sensing circuit may be operable in a fingerprint identification mode or a noise detection mode, thereby improving the accuracy of fingerprint identification. Furthermore, according to the present disclosure, noise having different frequencies may be selectively detected. Therefore, the interference caused by the noise having a specific frequency to the pixel sensing circuit.

DETAILED DESCRIPTION

In order to make the objectives, technical solutions, and advantages of the present disclosure clearer, the present disclosure is further described in detail below by reference to the embodiments and the accompanying drawings. It should be understood that the embodiments described here are only exemplary ones for illustrating the present disclosure, and are not intended to limit the present disclosure.

According to the present disclosure, the noise detection function is integrated into the pixel sensing circuit for fingerprint identification, to improve the accuracy of fingerprint identification. Furthermore, according to the present disclosure, noise having different frequencies may be selectively detected. Therefore, the interference caused by the noise having a specific frequency to the pixel sensing circuit.

Figure 1A:
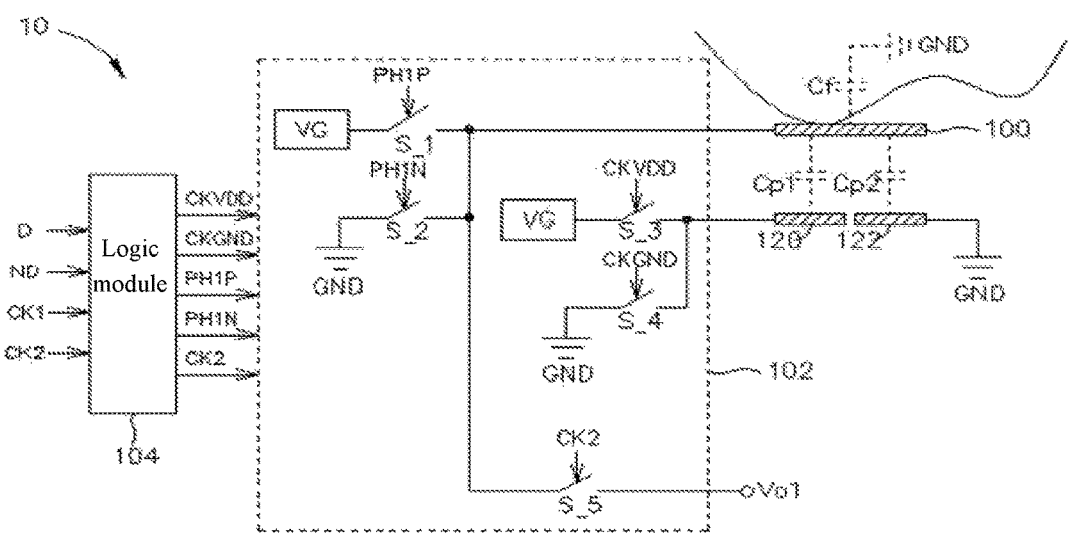
FIG. 1A is a schematic structural diagram of a pixel sensing circuit 10 according to Embodiment 1 of the present disclosure.

As illustrated in FIG. 1A, FIG. 1A is a schematic structural diagram of a pixel sensing circuit 10 according to Embodiment 1 of the present disclosure. The pixel sensing circuit 10 is used in a fingerprint identification system, and is coupled to a logic module 104. The logic module 104 may generate clock pulse signals PH1P (a positive voltage equipotential signal), PH1N (a ground equipotential signal), CKVDD (a positive voltage clock pulse signal) and CKGND (a ground clock pulse signal) according to a direction signal D, a noise detection signal ND, and clock pulse signals CK1 (a first clock pulse signal) and CK2 (a second clock pulse signal); and send the clock pulse signals PH1P, PH1N, CKVDD, CKGND and CK2 to the pixel sensing circuit 10 to control the pixel sensing circuit 10 to be in a fingerprint identification mode or a noise detection mode.

To be specific, the pixel sensing circuit 10 includes a capacitance sensing layer 100, shielding layers 120 (a first-type shielding layer) and 122 (a second-type shielding layer), and a charging circuit 102. The capacitance sensing layer 100, and the shielding layers 120 and 122 may be metal layers deployed and designed in an integrated circuit board, the capacitance sensing layer 100 and a ground terminal GND form a contact capacitor Cf (for example, the case where a finger touches the capacitance sensing layer 100, and the ground is connected via a human body), the shielding layer 122 is coupled to the ground terminal GND, and the shielding layers 120 and 122 are spaced apart and insulated from each other and respectively form parasitic capacitance Cp1 and Cp2 with the capacitance sensing layer 100. The charging layer 102 is coupled to the capacitance sensing layer 100 and the shielding layers 120 and 122, includes a positive voltage generator VG and switches S_1 to S_5, and adjust connections between the positive voltage generator VG and the capacitance sensing layer 100 and the shielding layer 120 to periodically provide a positive voltage VDD for the capacitance sensing layer 100 and the shielding layer 120 or control the positive voltage generator VG and the capacitance sensing layer 100 to be in a float-connection state.

To be specific, when the pixel sensing circuit 10 is in the fingerprint identification mode under control of the logic module 104, the charging circuit 102 charges the contact capacitor Cf and the parasitic capacitors Cp1 and Cp2. Specifically, the charging circuit 102 provides a positive voltage VDD for the capacitance sensing layer 100 and the shielding layer 120 within a first half period T1 (first duration) of a period T (a positive mode), or provides a positive voltage for the shielding layer 120 within a second half period T2 (second duration) within the period T (a negative mode). In other words, the logic module 104 controls, according to the direction signal D, the charging circuit 102 to periodically provide a positive voltage VDD to the capacitance sensing layer 100 and the shielding layer, to charge the contact capacitor Cf and the parasitic capacitors Cp1 and Cp2. When the pixel sensing circuit 10 is in the noise detection mode under control of the logic module 104, the charging circuit 102 cuts off the connections between the positive voltage generator VG and the capacitance sensing layer 100 and the shielding layer 120, to maintain the positive voltage generator VG and the capacitance sensing layer 100 in the float-connection state. In addition, the logic module 104 controls the charging circuit 102 to periodically output a voltage of the capacitance sensing layer 100 to a first output terminal Vo1.

The logic module 104 may control, according to the direction signal D, the pixel sensing circuit 10 to switch between the positive mode and the negative mode. When the pixel sensing circuit 10 is controlled to be in the fingerprint identification mode and in the positive mode, the charging circuit 102 provides a positive voltage VDD for the capacitance sensing layer 100 and the shielding layer 120 within the first half period T1 within the period T such that the capacitance sensing layer 100 and the shielding layer 120 have the same potential, and in this case, the charging circuit 102 charges the contact capacitor Cf and the parasitic capacitor Cp2; and conducts the connection between the ground terminal GND and the shielding layer 120 within the second half period T2 of the period T, and the charges of the capacitors Cp2 and Cf flow towards the capacitor Cp1, thereby outputting a voltage to the first output terminal Vo1. When the pixel sensing circuit 10 is controlled to be in the fingerprint identification mode and in the negative mode, the charging circuit 102 conducts the connections between the ground terminal GND and the capacitance sensing layer 100 and the shielding layer 120 within the first half period T1 of the period T, to clear the charges of the capacitors Cf, Cp1 and Cp2; and the charging circuit provides a positive voltage VDD for the shielding layer within the second half period T2 of the period T, and in this case, the charging circuit 102 charges the parasitic capacitor Cp1, and the charges of the parasitic capacitor Cp1 may flow towards the capacitors Cp2 and Cf, thereby outputting a voltage to the first output terminal Vo1.

To perform the above described operations, the switch S_1 (a first sensing switch) is coupled between the positive voltage generator VG and the capacitance sensing layer 100, the switch S_2 (a second sensing switch) is coupled between the ground terminal GND and the capacitance sensing layer 100, the switch S_3 (a first shielding switch) is coupled between the positive voltage generator VG and the shielding layer 120, the switch S_4 (a second shielding switch) is coupled between the ground terminal GND and the shielding layer 120, and the switch S_5 (an output switch) is coupled between the capacitance sensing layer 100 and the first output terminal Vo1. When the pixel sensing circuit is in the positive mode, the logic module 104 controls, via the clock pulse signal PH1P, the switch S_1 to be conducted within the first half period T1, controls, via the clock pulse signal CKVDD, the switch S_3 to be conducted within the first half period T1, provides a voltage for the capacitance sensing layer 100 and the shielding layer 120, and charge the contact capacitor Cf and the parasitic capacitor Cp2; the logic module 104 controls, via the clock pulse signal CKGND, the switch S_4 to be conducted within the second half period T2, and the charges stored in the capacitors Cp2 and Cf within the first half period T1 may flow towards the capacitor Cp1, and in this case, the output voltage of the first output terminal Vo1 is $$Vo1 = \frac{VDD \times (Cp2 + Cf)}{Cp1 + Cp2 + Cf}.$$

When the pixel sensing circuit is in the negative mode, the logic module 104 controls, via the clock pulse signal CKVDD, the switch S_3 to be conducted within the second half period T2, provides a negative voltage VDD for the shielding layer 120, and charges the capacitor Cp1, and the charges in the capacitor Cp1 may flow towards the capacitors Cp2 and Cf, and in this case, the output voltage of the first output terminal Vo1 is $$Vo1 = \frac{VDD \times Cp1}{Cp1 + Cp2 + Cf};$$

the logic module 104 respectively controls, via the clock pulse signals PH1N and CKGND, the switch S_2 and the switch S_4 to be conducted within the first half period T1, and conduct the connections between the ground terminal and the capacitance sensing layer 100 and the shielding layer 120.

Figure 1B:
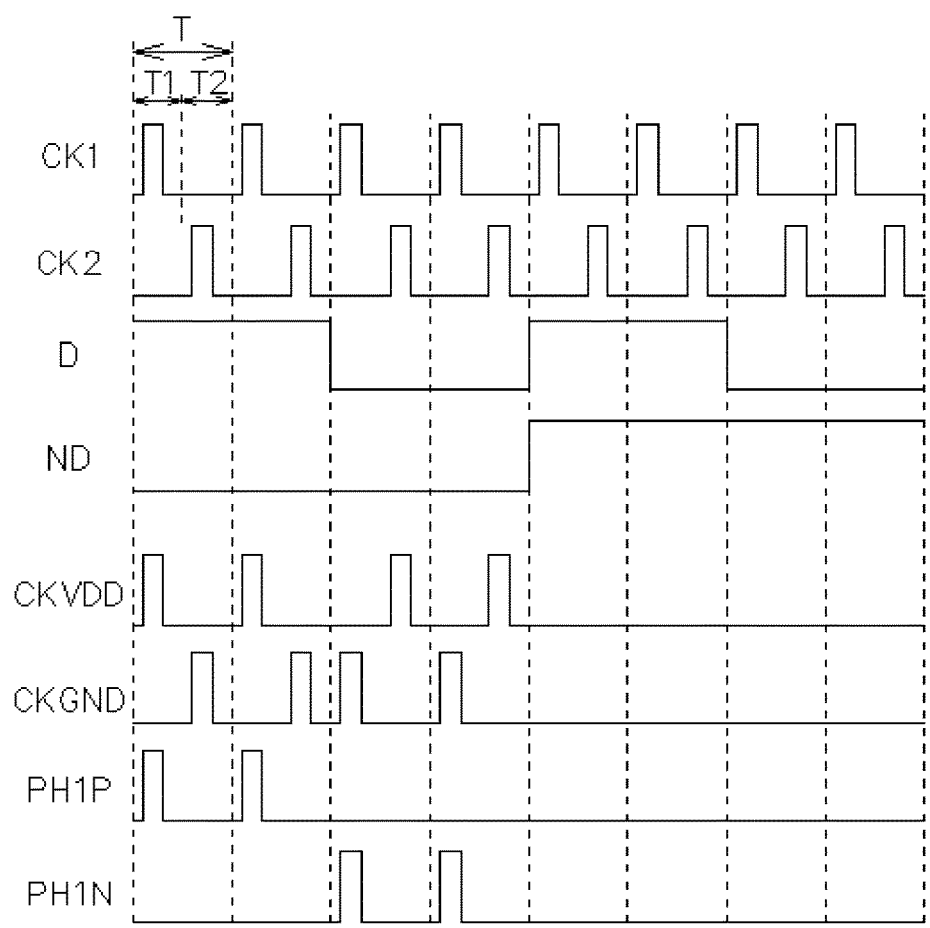
FIG. 1B illustrates waveforms of relevant signals in FIG. 1A.

As seen from the above, the logic module 104 generates the clock pulse signals PH1P, PH1N, CKVDD and CKGND according to the direction signal, the noise detection signal ND and the clock pulse signals CK1 and CK2 to control the conduction of the switches S_1 to S_4; wherein the clock pulse signal PH1P is configured to control conduction of the switch S_1, the clock pulse signal PH1N is configured to control conduction of the switch S_2, the clock pulse signal CKVDD is configured to control conduction of the switch S_3, and the clock pulse signal CKGND is configured to control conduction of the switch S_4. For example, as illustrated in FIG. 1B, FIG. 1B illustrates waveforms of relevant signals in FIG. 1A. The clock pulse signal CK1 has a pulse wave within the first half period T1, and the clock pulse signal CK2 has a pulse wave within the second half period T2. When the direction signal D is equal to 1 (indicating the positive mode) and the noise detection signal ND is equal to 0 (indicating the fingerprint identification mode), the clock pulse signals CKVDD and PH1P are the clock pulse signal CK1, the clock pulse signal CKGND is the clock pulse signal CK2, and the clock pulse signal PN1N is constantly 0; on the contrary, when the direction signal D is equal to 0 (indicating the negative mode) and the noise detection signal ND is equal to 0, the clock pulse signal CKVDD is the clock pulse signal CK2, the clock pulse signals CKGND and PH1N are the clock pulse signal CK1, and the clock pulse signal PH1P is constantly 0. In addition, the switch S_5 is conducted within the second half period T2 of the period T, and the switch S_5 is controlled by the clock pulse signal CK2. As such, the charging circuit 102 periodically may output the voltage of the capacitance sensing layer 100 to the first output terminal Vo1, and may determine the capacitance of the contact capacitor Cf according to the voltage of the first output terminal Vo1.

In another aspect, when the noise detection signal ND is equal to 1 (indicating the noise detection mode), no matter what is the value of the direction signal D, the clock pulse signals PH1P, PH1N, CKVDD and CKGND are all 0. To be specific, the charging circuit 102 cuts off the connections of the positive voltage generator VG and the capacitance sensing layer 100 and the shielding layer 120, to maintain the positive voltage generator VG and the capacitance sensing layer 100 to be in a float-connection state. In this case, the voltage of the first output terminal Vo1 is the noise, and the first output terminal Vo1 may be coupled to a rear noise detecting module to detect the noise.

In addition, a passivation layer (which may also be referred to as an insulating medium layer, and is not illustrated in the drawings) may be provided on the capacitance sensing layer 100). In this case, the capacitance sensing layer 100 may receive contact (for example, contact by a finger) through the passivation layer; wherein the passivation layer may be made from a glass or sapphire or the like material, which is not limited herein. The shielding layers 120 and 122 are arranged under the capacitance sensing layer 100 and are parallel to the capacitance sensing layer 100, and the shielding layers 120 and 122 overlap the capacitance sensing layer 100 relative to a projection result of the capacitance sensing layer 100. The shielding layers 120 and 122 are configured to achieve a shielding effect against the circuit under the shielding layers.

Therefore, when the pixel sensing circuit 10 is in the fingerprint identification mode, the fingerprint identification system may determine the capacitance of the contact capacitor Cf according to the voltage of the first output terminal Vo1, and hence to detect ridges and valleys of the fingerprint. To be detailed, the capacitance of the contact capacitor Cf may vary as the finger of a user approaches the capacitance sensing layer 100. When the finger of the user does not approach the capacitance sensing layer 100, the capacitance of the capacitor Cf may be considered to be 0; and when the finger of the user approaches the capacitance sensing layer 100, the contact capacitor has a non-zero capacitance. Further, when the ridges of the fingerprint of the user are located at a position where the pixel sensing circuit 10 is located, the contact capacitor Cf having a great capacitance is formed between the capacitance sensing layer 100 and the ground terminal; and on the contrary, when the valleys of the fingerprint of the user are located at a position where the pixel sensing circuit 10 is located, the contact capacitor Cf having a small capacitance is formed between the capacitance sensing layer 100 and the ground terminal. In brief, the fingerprint identification system may sense variations of the capacitance of the contact capacitor Cf, and judge whether the position of the pixel sensing circuit 10 corresponds to the ridges or valleys of the fingerprint. In another aspect, when the pixel sensing circuit 10 is in the noise detection mode, the capacitance sensing layer 100 and the shielding layer are both in the float-connection state, the noise output by the first output terminal Vo1 is provided for the rear noise detecting module for noise detection, and the fingerprint identification system may improve the entire accuracy of the fingerprint identification according to a detection result of the rear noise detecting module.

Furthermore, to enable the output voltage of the pixel sensing circuit 10 to better reflect the variations of the capacitance of the contact capacitor Cf, an integrator may be additionally coupled to the first output terminal Vo1, to improve the accuracy of fingerprint identification. It should be noted that when the pixel sensing circuit 10 is in the positive mode, since the voltage of the first output terminal Vo1

$$Vol = \frac{VDD \times (Cp2 + Cf)}{Cp1 + Cp2 + Cf}, \frac{dVol}{dCf} = \frac{VDD \times Cp1}{(Cp1 + Cp2 + Cf)^2} > 0$$

may be obtained by carrying out integration for the contact capacitor Cf, that is, the voltage of the first output terminal Vo1 increases with the increase of the capacitance of the contact capacitor Cf; on the contrary, when the pixel sensing circuit 10 is in the negative mode, since the voltage of the first output terminal Vo1

$$Vol = \frac{VDD \times Cp1}{Cp1 + Cp2 + Cf}, \frac{dVol}{dCf} = \frac{VDD \times Cp1}{(Cp1 + Cp2 + Cf)^2} < 0$$

may be obtained by carrying out integration for the contact capacitor Cf, that is, the voltage of the first output terminal Vo1 decreases with the increase of the capacitance of the contact capacitor Cf. Therefore, the integrator needs to adjust the operation mode thereof in the positive mode or the negative mode, to improve the accuracy of fingerprint identification.

Figure 2A:
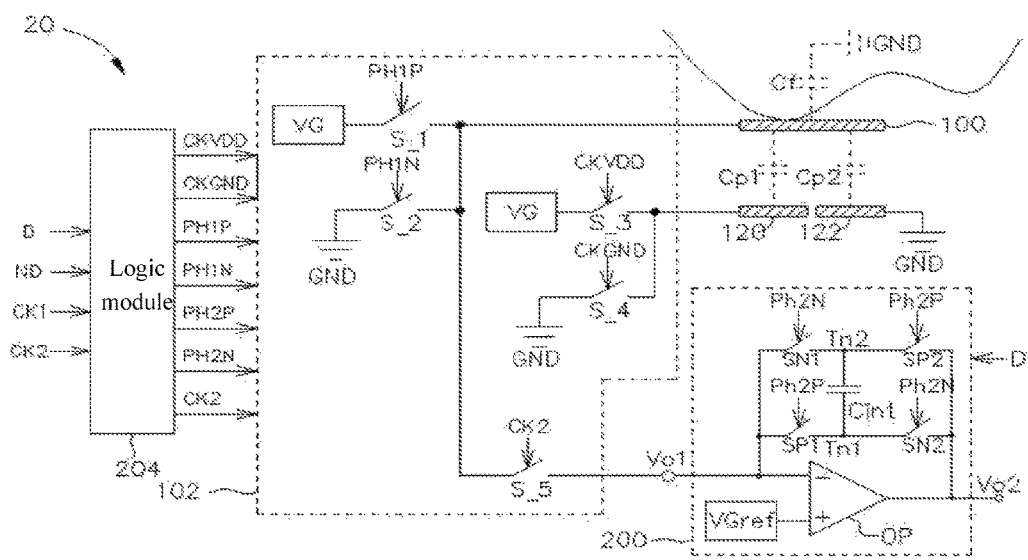
FIG. 2A is a schematic structural diagram of a pixel sensing circuit 20 according to Embodiment 2 of the present disclosure.

As illustrated in FIG. 2A, FIG. 2A is a schematic structural diagram of a pixel sensing circuit 20 according to Embodiment 2 of the present disclosure. The pixel sensing circuit 20 is similar to the pixel sensing circuit 10 in terms of structure. Therefore, the same components are still denoted by the same reference numerals as used above. Different from the pixel sensing circuit 10, the pixel sensing circuit 20 further includes a bidirectional integrator 200, and a logic module 204 (which is the same as the logic module 104, but some logic circuits are added) of the pixel sensing circuit 20 generates the clock pulse signals CKVDD, CKGND, PH1P, PH1N, PH2P and PH2N according to the direction signal D, the noise detection signal ND and the clock pulse signals CK1 and CK2, and send the clock pulse signals CKVDD, CKGND, PH1P, PH1N, PH2P and PH2N to the charging circuit 102. The bidirectional integrator 200 is coupled to the first output terminal Vo1 and receives the direction signal D, and may, under control of the logic module 204, carry out positive integration in the positive mode, and carry out negative integration in the negative mode.

To be specific, the bidirectional integrator 200 includes an amplifier OP, an integrating capacitor Cint, a reference voltage generator VGref, and switches SP1, SP2, SN1 and SN2. The amplifier OP includes a positive input terminal (which is illustrated as + in the drawings), a negative input terminal (which is illustrated as − in the drawings) and a second output terminal Vo2, wherein the negative output terminal of the amplifier OP is coupled to the first output terminal Vo1; and the integrating capacitor Cint includes a first terminal Tn1 and a second terminal Tn2. When the bidirectional integrator 200 carries out the positive integration, the logic module 204 controls the switches SP1, SP2, SN1 and SN2, such that the first terminal Tn1 of the integrating capacitor Cint is coupled to the negative input terminal of the amplifier OP, and the second terminal Tn2 of the integrating capacitor Cint is coupled to the second output terminal Vo2 of the amplifier OP; when the bidirectional integrator 200 carries out the negative integration, the logic module 204 controls the switches SP1, SP2, SN1 and SN2, such that the first terminal Tn1 of the integrating capacitor Cint is coupled to the second output terminal Vo2 of the amplifier OP, and the second terminal Tn2 of the integrating capacitor Cint is coupled to the negative terminal of the amplifier OP. The reference voltage generator VGref is configured to generate a reference voltage Vref to the positive input terminal of the amplifier OP.

To be specific, the switch SP1 (a first positive switch) is coupled between the negative input terminal of the amplifier OP and the first terminal Tn1 of the integrating capacitor Cint, the switch SP2 (a second positive switch) is coupled between the second terminal Tn2 of the integrating capacitor and the second output terminal Vo2 of the amplifier OP, the switch SN1 (a first negative switch) is coupled between the negative input terminal of the amplifier OP and the second terminal Tn2 of the integrating capacitor Cint, and the switch SN2 (a second negative switch) is coupled between the first terminal Tn1 of the integrating capacitor Cint and the second output terminal Vo2 of the amplifier OP. The logic module 204 controls, via the clock pulse signal PH2P, the switch SP1 and the switch SP2 to be conducted in the positive mode, such that the first terminal Tn1 of the integrating capacitor Cint is coupled to the negative input terminal of the amplifier OP and the second terminal Tn2 of the integrating capacitor Cint is coupled to the second output terminal Vo2 of the amplifier OP; and the logic module 204 controls, via the clock pulse signal PH2N, the switch SN1 and the switch SN2 to be conducted in the negative mode, such that the first terminal Tn1 of the integrating capacitor Cint is coupled to the second output terminal Vo2 of the amplifier OP, and the second terminal Tn2 of the integrating capacitor Cint is coupled to the negative terminal of the amplifier OP.

As seen from the above, the logic module 204 may generate generates the clock pulse signals PH2P (a negative clock pulse signal) and PH2N (a negative clock pulse signal) according to the clock pulse signal CK2 and the direction signal D, to thus control conduction of the switches SP1, SP2, SN1 and SN2; wherein the clock pulse signal PH2P is configured to control conduction of the switches SP1 and SP2, and the clock pulse signal PH2N is configured to control conduction of the switches SN1 and SN2. In addition, like the logic module 104, the logic module 204 also generates the clock pulse signals CKVDD and CKGND. In this embodiment, the logic module 204 may firstly generate the clock pulse signals PH1P and PH1N by using the clock pulse signal CK2 and the direction signal D and generate the clock pulse signals PH2P and PH2N by using the clock pulse signal CK2 and the direction signal D; and then generates the clock pulse signal CKVDD by using the clock pulse signals PH1P and PH2N and the noise detection signal ND and generates the clock pulse signal CKGND by using the clock pulse signals PH2P and PH1N and the noise detection signal ND. To be detailed, the clock pulse signals PH1P, PH1N, PH2P and PH2N may be generated by using the following Boolean logic equations:

PH1P=CK1 & D&(!ND), PH1N=CK1 &(!D)& (!ND);

PH2P=CK2 & D, PH2N=CK2 &(!D);

The clock pulse signals CKVDD and CKGND may be generated by using the following Boolean logic equations:

CKVDD=(PH1P|PH2N)&(!ND);

CKGND=(PH2P|PH1N)&(!ND);

As such, the logic module 204 may respectively control, via the clock pulse signals PH1P, PH1N, PH2P, PH2N, CKVDD and CKGND, conduction of the switches SP1 and SP2, the switches SN1 and SN2 and the switches S_1 to S_4;

and the charging circuit 102 and the bidirectional integrator 200 may practice the circuit behaviors as described above.

Figure 2B:
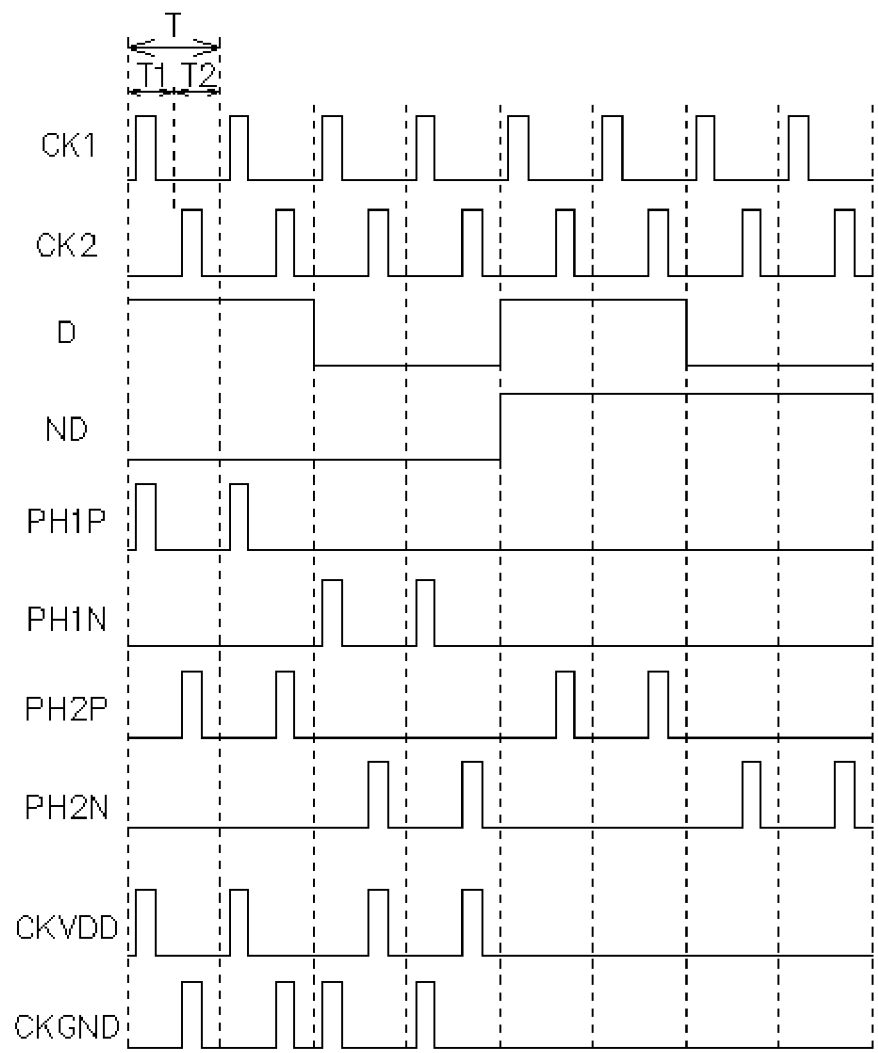
FIG. 2B illustrates waveforms of a relevant signals in FIG. 2A.

FIG. 2B illustrates waveforms of the plurality of clock pulse signals. As illustrated in FIG. 2B, in the fingerprint identification mode (the noise detection signal ND is equal to 0), when the direction signal D is equal to 1, the clock pulse signal PH1P is the clock pulse signal CK1, the clock pulse signal PH2P is the clock pulse signal CK2, the clock pulse signals PH1N and PH2N are both 0, the clock pulse signal CKVDD is the clock pulse signal PH1P (that is, the clock pulse signal CK1), the clock pulse signal CKGND is the clock pulse signal PH2P (that is, the clock pulse signal CK2). To be specific, in the positive mode, when the voltage of the first output terminal increases with the increase of the capacitance of the contact capacitor Cf, the bidirectional integrator 200 carries out the positive integration. In another aspect, when the direction signal D is equal to 0, the clock pulse signal PH1N is the clock pulse signal CK1, the clock pulse signal PH2N is the clock pulse signal CK2, the clock pulse signals PH1P and PH2P are both 0, the clock pulse signal CKVDD is the clock pulse signal PH1N (that is, the clock pulse signal CK2), the clock pulse signal CKGND is the clock pulse signal PH2N (that is, the clock pulse signal CK1). To be specific, in the negative mode, when the voltage of the first output terminal Vo1 decreases with the increase of the capacitance of the contact capacitor Cf, the bidirectional integrator 200 carries out the negative integration, such that the integration result of the second output terminal is still positive. Therefore, no matter what the value of the direction signal D is, the bidirectional integrator 200 of the pixel sensing circuit 20 may correctly carry out integration for the charges stored in the contact capacitor Cf, and the voltage output by the second output terminal Vo2 of the bidirectional integrator 200 may be provided for the rear fingerprint detecting module for fingerprint identification.

In still another aspect, in the noise detection mode (the noise detection signal ND is equal to 1), no matter what the value of the direction signal D is, the clock pulse signals CKVDD, CKGND, PH1P and PH1N are all 0. In this case, the bidirectional integrator 200 still carries out the positive integration or the negative integration according to the directional signal D, the integration results output by the second output terminal Vo2 are all the integration results from the noise, and the rear noise detecting module may perform noise detection by using the voltage output by the second output terminal Vo2.

It should be noted that the direction signal D has a direction frequency, that is, a ratio that the direction signal D is 1 within a specific duration period (which may also be referred to a duty cycle), the direction frequency of the direction signal D is related to the frequency at which the pixel sensing circuit detects noise in the noise detection mode. For example, when the direction frequency of the direction signal is 50%, that is, the direction signal D is a signal 010101 with alternating 0 and 1, in the fingerprint identification mode, the noise from the ambient environment is offset by means of alternating of the positive integration and negative integration, thereby improving the accuracy of fingerprint identification. In addition, when the clock pulse signals CK1 and CK2 have a frequency of F Hz (that is, the reciprocal of the period T), the noise frequency affecting fingerprint identification is F/2 Hz, that is, a sampling rate of the noise frequency is F/2 Hz. Further, in the noise detection mode, the bidirectional integrator 200 only carries out integration for the noise at the frequency of F/2 Hz. As such, the noise at the frequency of F/2 Hz may be monitored. Analogously, the pixel sensing circuit 20 may adjust, according to the clock pulse signals CK1 and CK2, the direction frequency of the direction signal D to adjust the sampling frequency in noise detection. In this way, the grade of the noise at the sampling frequency may be monitored.

In the related art, if the noise at different frequencies needs to be detected, the clock pulse signals CK1 and CK2 need to be modified. When different pixel sensing circuits are to detect the noise at different frequencies, the different pixel sensing circuits need to access different clock pulse signals CK1 and CK2, which is difficult in practice. Relatively, the pixel sensing circuit according to the present disclosure may be operable in the fingerprint identification mode or the noise detection mode to improve the accuracy of fingerprint identification, switch between the positive mod and the negative mode according to the direction signal, and adjust the sampling frequency in noise detection by adjusting the direction frequency of the direction signal, to selectively detect the noise at different frequencies.

It should be noted that the above embodiments are intended to interpret the concepts of the present disclosure, and a person skilled in the art would made different modifications, which are not limited in the present disclosure. For example, the manner of generating the direction signal D is not limited, the direction signal D may be a pseudo random code or a Hadamard code or may be generated by using a shift register of code division multiple access (CDMA), which is not limited in the present disclosure.

In addition, the number of shielding layers is not limited, and a plurality of shielding layers may be used to achieve a shielding effect. For example, according to the conduction manner, the plurality of shielding layers may be differentiated as first-type shielding layers and second-type shielding layers, wherein the first-type shielding layer is a shielding layer coupled to the capacitance sensing circuit and the second-type shielding layer is a shielding layer coupled to the ground terminal. Therefore, a first parasitic capacitor is formed between the first-type shielding layer and the capacitance sensing layer, and a second parasitic capacitor is formed between the second-type shielding layer and the capacitance sensing layer. The capacitance of the first parasitic capacitor is relevant to the area, length, shape and the like of each shielding layer in the first-type shielding layers; likewise, the capacitance of the second parasitic capacitor is relevant to the area, length, shape and the like of each shielding layer in the second-type shielding layers; and the value of the reference voltage is obtained via suitable design according to the capacitances of the first parasitic capacitor and the second parasitic capacitor. Therefore, achieving the shielding effect by using a plurality of shielding layers satisfies the requirements of the present disclosure.

In conclusion, the pixel sensing circuit according to the present disclosure may be operable in the fingerprint identification mode or the noise detection mode to improve the accuracy of fingerprint identification, switch between the positive mod and the negative mode according to the direction signal, and adjust the sampling frequency in noise detection by adjusting the direction frequency of the direction signal, to selectively detect the noise at different frequencies.

An embodiment of the present disclosure further provides a fingerprint identification system including a plurality of pixel sensing circuits as described above, wherein the plurality of pixel sensing circuits are arranged to an array. To be specific, the included plurality of capacitance sensing layers are arranged to an array to form a touch panel for the fingers.

An embodiment of the present disclosure further provides an electronic device including the above fingerprint identification system.

The above descriptions are merely preferred embodiments of the present disclosure, but not intended to limit the present disclosure. Any modification, equivalent replacement, and improvement made without departing from the spirit and principle of the present disclosure shall fall within the protection scope of the present disclosure.

INDUSTRIAL APPLICABILITY

With the pixel sensing circuit for fingerprint identification, the fingerprint identification system and the electronic device thereof according to the present disclosure, the noise detection function is integrated into the pixel sensing circuit for fingerprint identification, such that the pixel sensing may be operable in a fingerprint identification mode or a noise detection mode, thereby improving the accuracy of fingerprint identification. In addition, the pixel sensing circuit switches between a positive mode and a negative mode according to a direction signal, and adjusts the sampling frequency in noise detection by adjusting the direction frequency of the direction signal, to selectively detect the noise at different frequencies, which eliminates the interference caused by the noise at a specific frequency to the pixel sensing circuit.

What is claimed is:

1. A pixel sensing circuit for fingerprint identification, the pixel sensing circuit being in a fingerprint identification mode and a noise detection mode, the pixel sensing circuit comprising:
    a capacitance sensing layer;
    a plurality of shielding layers, comprising a first-type shielding layer and a second-type shielding layer, the second-type shielding layer being coupled to a ground terminal; and
    a charging circuit, coupled to the capacitance sensing layer and the first-type shielding layer, and comprising a positive voltage generator configured to providing a positive voltage;
    wherein when the pixel sensing circuit is in a fingerprint identification mode, the charging circuit periodically provides the positive voltage for the capacitance sensing layer and the first-type shielding layer; and
    when the pixel sensing circuit is in the noise detection mode, the charging circuit cuts off connections between the positive voltage generator and the capacitance sensing layer and the first-type shielding layer, and the charging circuit periodically outputs a voltage of the capacitance sensing layer to a first output terminal,
    wherein the pixel sensing circuit is switched between a positive mode and a negative mode, when the pixel sensing circuit is in the fingerprint identification mode and in the positive mode, the charging circuit provides the positive voltage for the capacitance sensing layer and the first-type shielding layer in a first duration within a period, and conducts the connection between the ground terminal and the first-type shielding layer in a second duration within the period; and
    when the pixel sensing circuit is in the fingerprint identification mode and in the negative mode, the charging circuit conducts a connection between the ground terminal and the capacitance sensing layer and the first-type shielding layer.

2. The pixel sensing circuit according to claim 1, wherein the charging circuit comprises:
    an output switch, coupled between the capacitance sensing layer and the first output terminal;
    a first sensing switch, coupled between the positive voltage generator and the capacitance sensing layer;
    a second sensing switch, coupled between the ground terminal and the capacitance sensing layer;
    a first shielding switch, coupled between the positive voltage generator and the first-type shielding layer; and
    a second shielding switch, coupled between the ground terminal and the second-type shielding layer;
    wherein the output switch is conducted in the second duration;
    wherein when the pixel sensing circuit in the positive mode, the first sensing switch and the first shielding switch are conducted in the first duration, and the second shielding switch is conducted in the second duration; or
    wherein when the pixel sensing circuit in the negative mode, the first sensing switch is conducted in the second duration, and the second sensing switch and the second shielding switch are conducted in the first duration.

3. The pixel sensing circuit according to claim 2, further comprising a logic module;
    wherein the logic module is configured to receive a first clock pulse signal, a second clock pulse signal, a direction signal and a noise signal, and generates a positive voltage equipotential signal, a ground equipotential signal, a positive voltage clock pulse signal and a ground clock pulse signal according to the first clock pulse signal, the second clock pulse signal, the direction signal and the noise signal, wherein the positive voltage equipotential signal is configured to control conduction of the first sensing switch, the ground equipotential signal is configured to control conduction of the second sensing switch, the positive voltage clock pulse signal is configured to control conduction of the first shielding layer, the ground clock pulse signal is configured to control conduction of the second shielding layer, and the direction signal is configured to control the pixel sensing circuit to be in the positive mode or the negative mode.

4. The pixel sensing circuit according to claim 3, further comprising a bidirectional integrator, coupled to the first output terminal, wherein positive integration is carried out when the pixel sensing circuit is in the positive node, and negative integration is carried out when the pixel sensing circuit is in the negative mode.

5. The pixel sensing circuit according to claim 4, wherein the bidirectional integrator comprises:
    an amplifier, comprising a positive input terminal, a negative input terminal and a second output terminal; and
    an integrating capacitor, comprising a first terminal and a second terminal;
    wherein when the bidirectional integrator carries out the positive integration, the first terminal of the integrating capacitor is coupled to the negative input terminal of the amplifier, and the second terminal of the integrating capacitor is coupled to the second output terminal of the amplifier; or when the bidirectional integrator carries out the negative integration, the first terminal of the integrating capacitor is coupled to the second output terminal of the amplifier, and the second terminal of the integrating capacitor is coupled to the negative input terminal of the amplifier.

6. The pixel sensing circuit according to claim 5, wherein the bidirectional integrator further comprises:
- a first positive switch, coupled between the negative input terminal of the amplifier and the first terminal of the integrating capacitor;
- a second positive switch, coupled between the second terminal of the integrating circuit and the second output terminal of the amplifier;
- a first negative switch, coupled between the negative input terminal of the amplifier and the second terminal of the integrating capacitor; and
- a second negative switch, coupled between the first terminal of the integrating circuit and the second output terminal of the amplifier;
- wherein the first positive switch and the second positive switch are conducted when the pixel sensing circuit is in the positive mode, and the first negative switch and the second negative switch are conducted when the pixel sensing circuit is in the negative mode.

7. The pixel sensing circuit according to claim 6, wherein the logic module is further configured to generate a positive clock pulse signal and a negative clock pulse signal according to the second clock pulse signal and the direction signal, wherein the positive clock pulse signal is configured to control conduction of the first positive switch and the second positive switch, and the negative clock pulse signal is configured to control conduction of the first negative switch and the second negative switch.

8. The pixel sensing circuit according to claim 3, wherein the direction signal has a direction frequency, and when being in the noise detection mode, the pixel sensing circuit is configured to detect noise at a specific frequency, the specific frequency being related to the direction frequency.

9. A fingerprint identification system comprising a plurality of pixel sensing circuits, the pixel sensing circuit comprising:
- a capacitance sensing layer;
- a plurality of shielding layers, comprising a first-type shielding layer and a second-type shielding layer, the second shielding layer being coupled to a ground terminal; and
- a charging circuit, coupled to the capacitance sensing layer and the first-type shielding layer, and comprising a positive voltage generator configured to providing a positive voltage;
- wherein when the pixel sensing circuit is in a fingerprint identification mode, the charging circuit periodically provides the positive voltage for the capacitance sensing layer and the first-type shielding layer; and
- when the pixel sensing circuit is in the noise detection mode, the charging circuit cuts off connections between the positive voltage generator and the capacitance sensing layer and the first-type shielding layer, and the charging circuit periodically outputs a voltage of the capacitance sensing layer to a first output terminal,
- wherein the pixel sensing circuit is switched between a positive mode and a negative mode, when the pixel sensing circuit is in the fingerprint identification mode and in the positive mode, the charging circuit provides the positive voltage for the capacitance sensing layer and the first-type shielding layer in a first duration within a period, and conducts the connection between the ground terminal and the first-type shielding layer in a second duration within the period; and
- when the pixel sensing circuit is in the fingerprint identification mode and in the negative mode, the charging circuit conducts a connection between the ground terminal and the capacitance sensing layer and the first-type shielding layer,
- wherein the plurality of pixel sensing circuits is arranged in an array.

10. An electronic device comprising a fingerprint identification system, wherein the fingerprint identification system comprising a plurality of pixel sensing circuits, wherein the pixel sensing circuit comprising:
- a capacitance sensing layer;
- a plurality of shielding layers, comprising a first-type shielding layer and a second-type shielding layer, the second shielding layer being coupled to a ground terminal; and
- a charging circuit, coupled to the capacitance sensing layer and the first-type shielding layer, and comprising a positive voltage generator configured to providing a positive voltage;
- wherein when the pixel sensing circuit is in a fingerprint identification mode, the charging circuit periodically provides the positive voltage for the capacitance sensing layer and the first-type shielding layer; and
- when the pixel sensing circuit is in the noise detection mode, the charging circuit cuts off connections between the positive voltage generator and the capacitance sensing layer and the first-type shielding layer, and the charging circuit periodically outputs a voltage of the capacitance sensing layer to a first output terminal,
- wherein the pixel sensing circuit is switched between a positive mode and a negative mode, when the pixel sensing circuit is in the fingerprint identification mode and in the positive mode, the charging circuit provides the positive voltage for the capacitance sensing layer and the first-type shielding layer in a first duration within a period, and conducts the connection between the ground terminal and the first-type shielding layer in a second duration within the period; and
- when the pixel sensing circuit is in the fingerprint identification mode and in the negative mode, the charging circuit conducts a connection between the ground terminal and the capacitance sensing layer and the first-type shielding layer,
- wherein the plurality of pixel sensing circuits is arranged in an array.

* * * * *